United States Patent
Mohanty et al.

(10) Patent No.: US 11,861,918 B2
(45) Date of Patent: Jan. 2, 2024

(54) IMAGE ANALYSIS FOR PROBLEM RESOLUTION

(71) Applicant: Dell Products L.P., Round Rock, TX (US)

(72) Inventors: Bijan Kumar Mohanty, Austin, TX (US); Hung Dinh, Austin, TX (US); Devipriya Selvaraju, Bangalore (IN); Karthik Sethuramalingam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 465 days.

(21) Appl. No.: 17/147,657

(22) Filed: Jan. 13, 2021

(65) Prior Publication Data

US 2022/0222481 A1    Jul. 14, 2022

(51) Int. Cl.
| | | |
|---|---|---|
| *G06F 16/30* | (2019.01) | |
| *G06F 40/30* | (2020.01) | |
| *G06V 20/62* | (2022.01) | |
| *G06N 3/04* | (2023.01) | |
| *G06F 40/284* | (2020.01) | |
| *G06N 20/00* | (2019.01) | |
| *G06F 18/214* | (2023.01) | |
| *G06F 18/2411* | (2023.01) | |

(52) U.S. Cl.
CPC .......... *G06V 20/62* (2022.01); *G06F 18/214* (2023.01); *G06F 18/2411* (2023.01); *G06F 40/284* (2020.01); *G06N 3/04* (2013.01); *G06N 20/00* (2019.01)

(58) Field of Classification Search
USPC ........... 382/113–229; 704/1–275; 706/1–62, 706/900–903; 707/705–780
See application file for complete search history.

(56) References Cited

U.S. PATENT DOCUMENTS

| | | | | |
|---|---|---|---|---|
| 9,990,268 | B2* | 6/2018 | Bommaraju | G06F 11/362 |
| 11,216,474 | B2* | 1/2022 | Pandey | G06F 16/2455 |
| 11,650,996 | B1* | 5/2023 | Daianu | G06Q 40/123 707/771 |
| 2019/0388057 | A1* | 12/2019 | Shen | A61B 8/4245 |
| 2021/0081819 | A1* | 3/2021 | Polleri | H04L 51/02 |
| 2021/0256415 | A1* | 8/2021 | Muthuswamy | G06F 17/16 |
| 2021/0256681 | A1* | 8/2021 | Segal | G06N 3/045 |

OTHER PUBLICATIONS

Wikipedia, "Natural Language," https://en.wikipedia.org/w/index.php?title=Natural_language&oldid=977532848, Sep. 9, 2020, 3 pages.

(Continued)

*Primary Examiner* — Marcellus J Augustin
(74) *Attorney, Agent, or Firm* — Ryan, Mason & Lewis, LLP

(57) ABSTRACT

A method comprises receiving an input of at least one image associated with an issue. In the method, text is extracted from the at least one image, and an intent is determined from the extracted text. The method further includes recommending a response to the issue based at least in part on the determined intent, and transmitting the recommended response to a user. The extracting, determining and recommending are performed at least in part using one or more machine learning models.

20 Claims, 14 Drawing Sheets

(56) References Cited

OTHER PUBLICATIONS

J. Brownlee, "How do Convolutional Layers Work in Deep Learning Neural Networks?" https://machinelearningmastery.com/convolutional-layers-for-deep-learning-neural-networks/, Apr. 17, 2020, 25 pages.

Computer Science Wiki, "Bounding Boxes," https://computersciencewiki.org/index.php?title=Bounding_boxes&oldid=8042, Apr. 13, 2018, 2 pages.

Dell Technologies, "Welcome to Support," https://www.dell.com/support/home/en-us, Accessed Jan. 13, 2021, 2 pages.

U.S. Appl. No. 17/077,357 filed in the name of Bijan Kumar Mohanty et al. on Oct. 22, 2020, and entitled "Intelligent Conversational Gateway."

* cited by examiner

| TEXTUAL MESSAGE | SEMANTIC INTENT |
|---|---|
| System Properties. The drivers for this device are not installed. | System driver; Device driver installation |
| Your PC ran into a problem and needs to restart | BSOD |
| Status:0xc00000e9<br>Windows failed to load because the system registry file is missing or corrupt | File corruption; Registry file corruption; Hard drive failure |

FIG. 7

```
In [ ]: import numpy as np
        import pandas as pd
        from nltk.corpus import stopwords
        from nltk.tokenize import word_tokenize
        from nltk.stem.lancaster import LancasterStemmer
        import nltk
        import re
        from sklearn.preprocessing import OneHotEncoder
        import matplotlib.pyplot as plt
        from keras.preprocessing.text import Tokenizer
        from keras.preprocessing.sequence import pad_sequences
        from keras.utils import to_categorical
        from keras.models import Sequential, load_model
        from keras.layers import Dense, LSTM, Bidirectional, Embedding, Dropout
        from keras.callbacks import ModelCheckpoint def load_dataset(filename):
            df = pd.read_csv(filename, encoding = "latin1", names = ("Sentence", "Intent"))
            print(df.head())
            intent = df["Intent"]
            unique_intent = list(set(intent))
```

FIG. 8

| ID | SEMANTIC INTENT | RESOLUTION |
|---|---|---|
| 1 | System driver; device driver installation | Installed driver by uploading from www.company.com/drivers/system |
| 2 | BSOD | Bootstrap was corrupt; system was re-imaged |
| 3 | File corruption; Registry file corruption; Hard drive failure | Dispatch for replacing hard drive at customer site |

ID
IMAGE ANALYSIS FOR PROBLEM RESOLUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to providing techniques for image analysis and problem resolution in such information processing systems.

BACKGROUND

Enterprises typically provide multiple channels (e.g., telephone, web-based, mobile applications, etc.) for their customers to interact with their support systems. For example, some enterprises provide search options to give customers access to knowledge through, for example, frequently asked questions (FAQs), guided steps for troubleshooting and articles in a knowledge base. These traditional support systems typically utilize text-based searches which are not very effective when it comes to supporting and/or troubleshooting complex problems or issues. Text-based searches also rely heavily on the use of keywords to understand semantics and return useful content.

In many problematic scenarios or outages, customers may be viewing certain images on the screens of their devices, and the images may include one or more messages about the problem. Using text-based searches in an attempt to describe an image and understand the root cause of a specific problem can be extremely difficult. For example, customers may not be able to write an accurate description identifying the exact problem (e.g., error code, etc.) that may be occurring. As a result, in response to the customer's description, a support system provides generic articles about the issue, requiring the customer to read, understand and apply heuristics to independently solve a problem. If customers are unable proceed further on their own, they will typically reach out to support agents for assisted support, thus minimizing the value of self-support systems.

SUMMARY

Illustrative embodiments provide image analysis techniques to identify and resolve issues and/or problems.

In one embodiment, a method comprises receiving an input of at least one image associated with an issue. In the method, text is extracted from the at least one image, and an intent is determined from the extracted text. The method further includes recommending a response to the issue based at least in part on the determined intent, and transmitting the recommended response to a user. The extracting, determining and recommending are performed at least in part using one or more machine learning models.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 7 depicts a table including details of intent training data according to an illustrative embodiment.

FIG. 8 depicts example pseudocode for intent analysis and classification according to an illustrative embodiment.

FIG. 9 depicts a table including details of intents and corresponding resolutions according to an illustrative embodiment.

FIG. 12 depicts example pseudocode for providing resolution information to users according to an illustrative embodiment.

DETAILED DESCRIPTION

Figure 1:
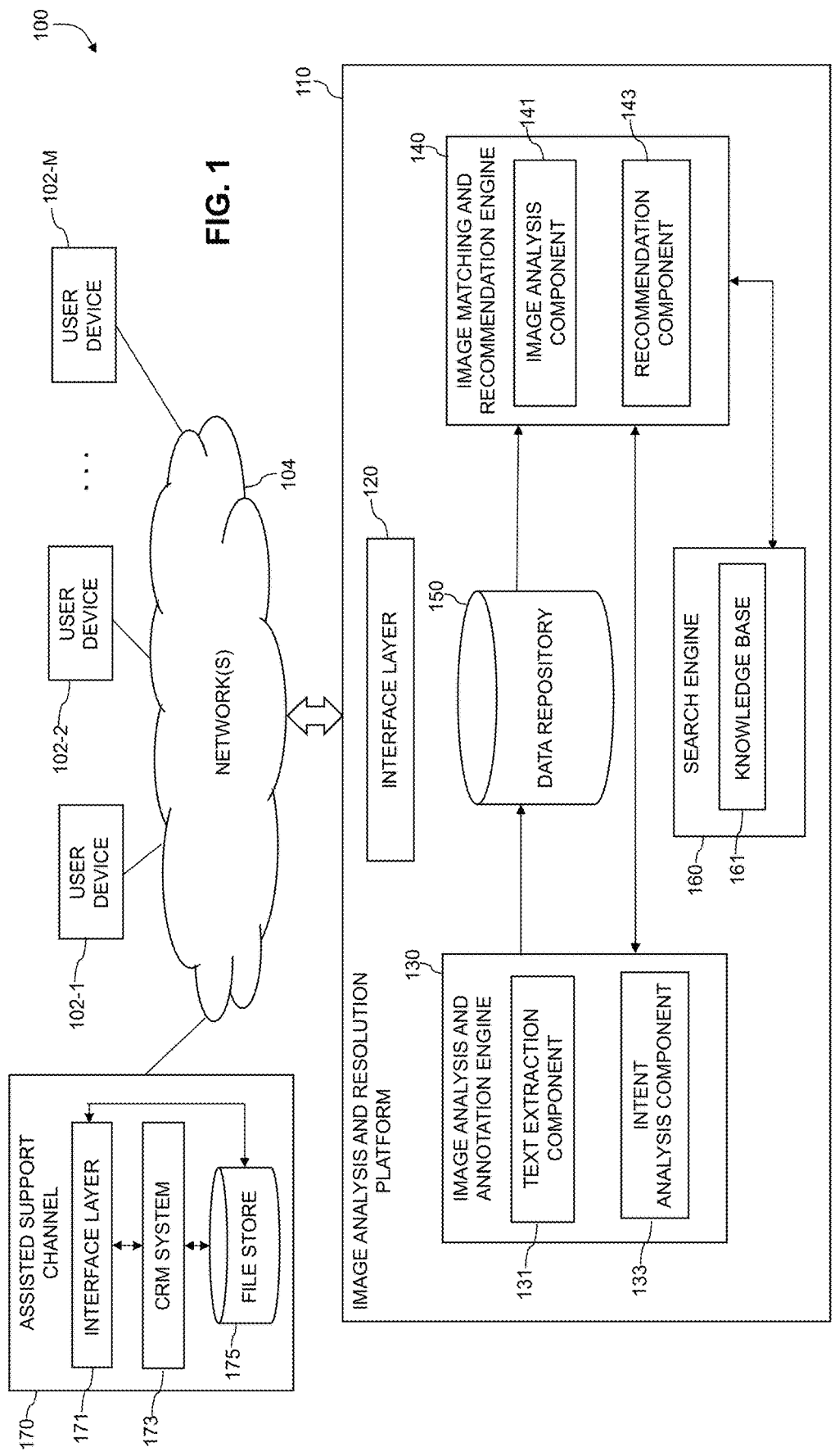
FIG. 1 depicts details of an information processing system with an image analysis and resolution platform for analyzing incoming image inputs and recommending appropriate resolutions according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "natural language" is to be broadly construed to refer to any language that has evolved naturally in humans. Non-limiting examples of natural languages include, for example, English, Spanish, French and Hindi.

As used herein, "natural language processing (NLP)" is to be broadly construed to refer to interactions between computers and human (natural) languages, where computers are able to derive meaning from human or natural language input, and respond to requests and/or commands provided by a human using natural language.

As used herein, "natural language understanding (NLU)" is to be broadly construed to refer to a sub-category of natural language processing in artificial intelligence (AI) where natural language input is disassembled and parsed to determine appropriate syntactic and semantic schemes in order to comprehend and use languages. NLU may rely on computational models that draw from linguistics to understand how language works, and comprehend what is being said by a user.

As used herein, "image" is to be broadly construed to refer to a visual representation which is, for example, produced on an electronic display such as a computer screen or other screen of a device. An image as used herein may include, but is not limited to, a screen shot, window, message box, error message or other visual representation that may be produced on a device. Images can be in the form of one or more files in formats including, but not necessarily limited to, Joint Photographic Experts Group (JPEG), Portable Network Graphics (PNG), Graphics Interchange Format (GIF), and Tagged Image File (TIFF).

In an illustrative embodiment, machine learning (ML) techniques are used to extract knowledge from images associated with system problems to predict the issues corresponding to the problems and provide users with targeted resolution steps. One or more embodiments leverage historical support case information comprising images and videos, and use the historical support case information as training data for one or more ML models. The trained ML models receive images corresponding to a problem from a user and determine matching images and support cases to automatically recommend resolutions which are specific to the problem. Although the embodiments herein are discussed in terms of images, the embodiments may alternatively apply to videos produced on a device in one or more formats such as, but not necessarily limited to, Moving Picture Experts Group (MPEG), Audio Video Interleave (AVI) and Windows Media Video (WMV).

FIG. 1 shows an information processing system 100 configured in accordance with an illustrative embodiment. The information processing system 100 comprises user devices 102-1, 102-2, ... 102-M (collectively "user devices 102"). The user devices 102 communicate over a network 104 with an image analysis and resolution platform 110. The information processing system further comprises an assisted support channel 170, which may communicate over the network with the user devices 102 and the image analysis and resolution platform 110.

The user devices 102 can comprise, for example, Internet of Things (IoT) devices, desktop, laptop or tablet computers, mobile telephones, or other types of processing devices capable of communicating with the image analysis and resolution platform 110 and/or the assisted support channel 170 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K and L are assumed to be arbitrary positive integers greater than or equal to two.

The assisted support channel 170 comprises an interface layer 171, a customer relationship management (CRM) system 173 and a file store 175. According to one or more embodiments, a CRM system 173 includes technical support personnel (e.g., agents) tasked with assisting users that experience issues with their devices, systems, software, firmware, etc. Users such as, for example, customers, may contact the technical support personnel when they have device and/or system problems and require technical assistance to solve the problems. Users may access the assisted support channel 170 through one or more interfaces supported by the interface layer 171. The interfaces include multiple communication channels, for example, websites, email, live chat, social media, mobile application and telephone sources. Users can access the assisted support channel 170 through their user devices 102. In response to user inquiries and/or requests for assistance, technical support personnel may create support tickets and/or cases summarizing the issues and the steps taken to resolve the issues.

As part of agent assisted support tickets and/or cases, screen shots and images related to the issues are collected along with any textual log files from the user (e.g., customer) and stored in the file store 175. These images, as well as any textual log files, can be used as reference data for technical support personnel to help diagnose and fix that specific case. After the case is complete, this data and images remain in the file store 175 as historical records.

The terms "client," "customer" or "user" herein are intended to be broadly construed so as to encompass numerous arrangements of human, hardware, software or firmware entities, as well as combinations of such entities. Image analysis and problem resolution services may be provided for users utilizing one or more machine learning models, although it is to be appreciated that other types of infrastructure arrangements could be used. At least a portion of the available services and functionalities provided by the image analysis and resolution platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the image analysis and resolution platform 110, as well as to support communication between the image analysis and resolution platform 110 and connected devices (e.g., user devices 102), between the assisted support channel 170 and connected devices and/or between other related systems and devices not explicitly shown.

In some embodiments, the user devices 102 are assumed to be associated with repair technicians, system administrators, information technology (IT) managers, software developers release management personnel or other authorized personnel configured to access and utilize the image analysis and resolution platform 110.

The image analysis and resolution platform 110 and the assisted support channel 170 in the present embodiment are assumed to be accessible to the user devices 102, and vice-versa, over the network 104. In addition, the image analysis and resolution platform 110 is accessible to the assisted support channel 170, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The image analysis and resolution platform 110, on behalf of respective infrastructure tenants each corresponding to one or more users associated with respective ones of the user devices 102, provides a platform for analyzing incoming image inputs and recommending appropriate resolutions.

Referring to FIG. 1, the image analysis and resolution platform 110 comprises an interface layer 120, an image analysis and annotation engine 130, an image matching and recommendation engine 140, a data repository 150 and a search engine 160. The image analysis and annotation engine 130 includes a text extraction component 131 and an intent analysis component 133. The image matching and recommendation engine 140 includes an image analysis component 141 and a recommendation component 143. The search engine 160 includes a knowledge base 161.

When there are system issues and/or outages, users may be presented with certain images on their devices (e.g., user devices 102). For example, in connection with a blue screen of death ("B SOD") problem, a user may see an image similar to the image 400 in FIG. 4, but without the borders around the different textual portions. In another example, a new device may fail to function due to a missing device driver, and the user may encounter an image including one or more textual phrases about missing and/or uninstalled components. Although issues and/or outages may be visually captured as images by a user, there are no existing platforms to analyze the images and recommend resolutions to the issues and/or outages based on the analysis.

Figure 2:
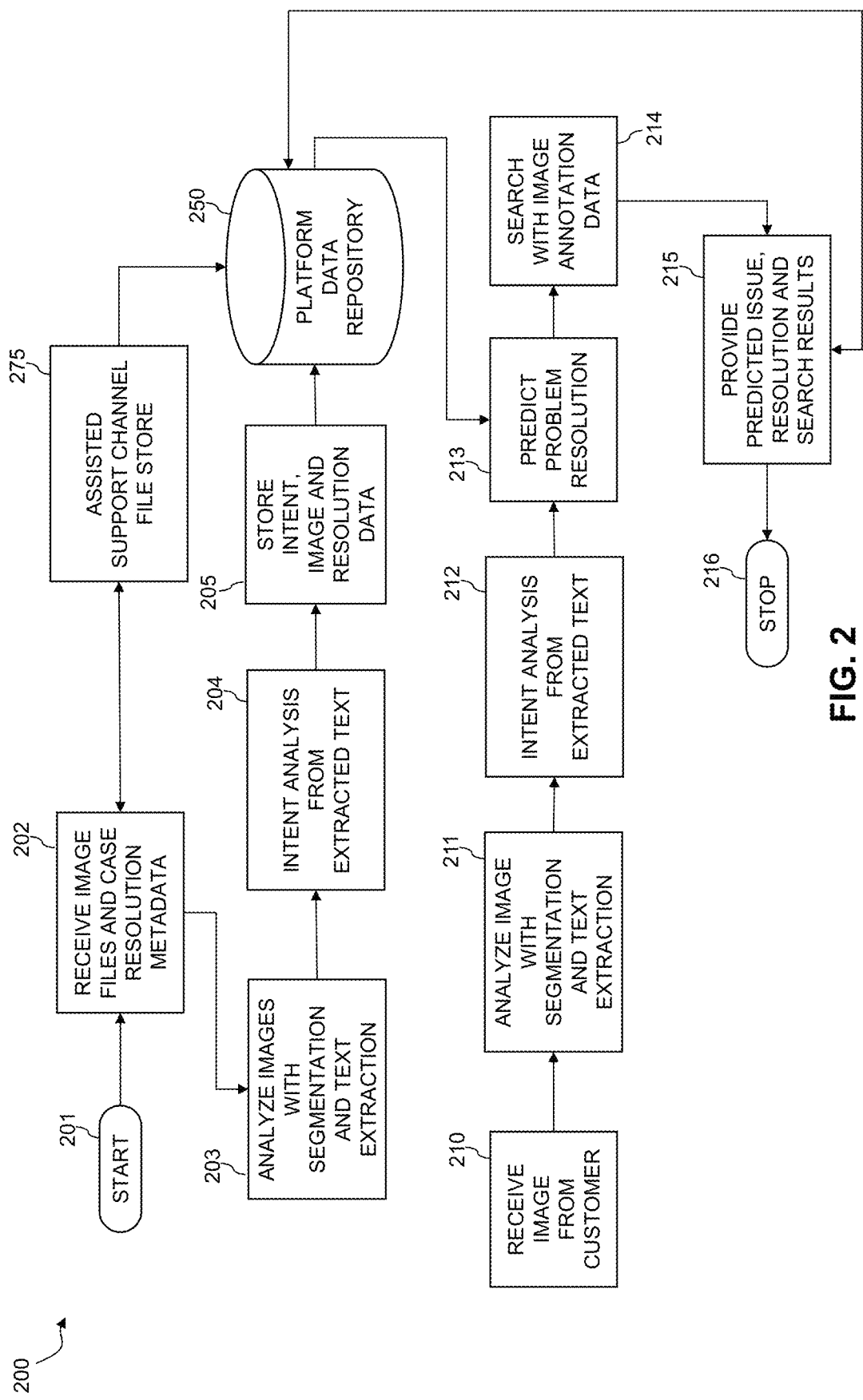
FIG. 2 depicts details of an operational flow for analyzing incoming image inputs and recommending appropriate resolutions according to an illustrative embodiment.

Referring to the system 100 in FIG. 1 and to the operational flow 200 in FIG. 2, the image analysis and annotation engine 130, and the image matching and recommendation engine 140 provide end-to-end capability for enhanced self-support. The image analysis and annotation engine 130 uses a mask region-based convolutional neural network (Mask-R-CNN) algorithm, and the image matching and recommendation engine 140 uses natural language processing (NLP) and distance similarity algorithms.

Referring to blocks 201 and 202 of operational flow 200, following a start of the operational flow 200, images and case resolution metadata are collected through assisted support channels (e.g., assisted support channel 170) from an assisted support channel file store 275 (or 175 in FIG. 1) and passed to the image analysis and annotation engine 130, which semantically analyzes the image and extracts text from the image. For example, referring to FIGS. 1 and 2, at block 203, the images are analyzed by the text extraction component 131, and at block 204, the intent analysis component 133 analyzes the extracted text to determine semantic intent from an image. Many images include useful text that is typically present in the image to convey important information to a user. For example, important textual objects and entities found in the image text can be critical to understanding the context and semantic intent of an issue and may assist with providing automatic case resolution or guidance to a customer. For example, in keeping with the example that a device may fail to function due to a missing device driver, text in an image associated with that failure may convey to a user that a device driver is not installed.

Based on the identified intents, the extracted text is annotated with intent identifiers and, at block 205, the identified intents and annotated extracted text are stored along with the image and case resolution data in platform data repository 250 (or 150 in FIG. 1) that forms a foundation for an image-based search by users. The data repository 150/250 includes mapped relationships between images, extracted text, intents and case resolutions to be used in connection with image-based analysis performed by the image analysis and resolution platform 110 upon receipt of one or more images from a user/customer in connection with a scenario where a user/customer is accessing a self-support portal to resolve issues and/or problems without assistance from support personnel.

According to one or more embodiments, a self-support portal provides a user with access to the image analysis and resolution platform 110 via the interface layer 120. Similar to the interface layer 171, the interface layer 120 supports multiple communication channels, for example, websites, email, live chat, social media and mobile applications. Users can access the image analysis and resolution platform 110 through their user devices 102. Referring to block 210 in FIG. 2, a user seeking to solve a problem or address an issue without help from technical support personnel can upload an image file (e.g., JPEG, GIF, TIFF, PNG or other type of image file) associated with the issue or problem via the interface layer 120 and the image is received by the image analysis and resolution platform 110. As noted herein, the image file may correspond to an image that appears on the screen of a user device in the event of a problem or issue such as, for example, a BSOD or an image including a message about a missing or uninstalled component. Similar to blocks 203 and 204 discussed above, at blocks 211 and 212, the image analysis component 141 of the image matching and recommendation engine 140 leverages the text extraction component 131 to extract text from the uploaded image (or images if a user uploads multiple images), and leverages the intent analysis component 133 to analyze the extracted text to determine semantic intent from the image. Referring to block 213, based on the identified intent, the recommendation component 143 predicts a resolution to the problem by matching the identified intent with corresponding historical images and associated resolutions stored in the platform data repository 250 (or 150 in FIG. 1). In addition, referring to block 214, a search engine (e.g., search engine 160 in FIG. 1) searches a knowledge base (e.g., knowledge base 161 in FIG. 1) with data annotated with intent identifiers based on the identified intent. The knowledge base 161 includes, for example, articles, product manuals and guided flows for resolving the given problem, which can be returned a user as search results in connection with a recommended resolution. As per block 215, the recommendation component 143 provides the predicted issue, recommended resolution and search results to a user.

Figure 3:
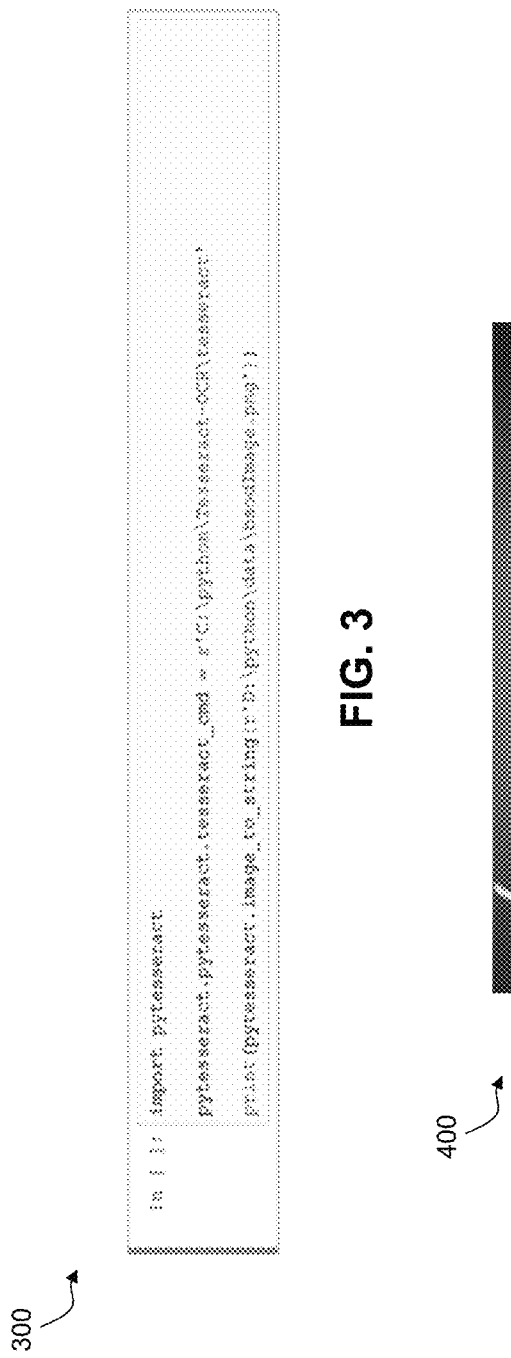
FIG. 3 depicts example pseudocode for text extraction from an image according to an illustrative embodiment.

The text extraction component 131 of the image analysis and annotation engine 130 extracts text and semantics from an uploaded customer image comprising structured and unstructured data. In order to parse through unstructured text, the embodiments utilize a combination of a Mask-R-CNN algorithm with optical character recognition (OCR), which accomplishes object detection, text object segmentation and text extraction for an inputted image. The pseudo-code 300 in FIG. 3 corresponds to utilization of OCR in connection with recognizing, reading and extracting text embedded in an image. The code includes, for example, Python® code.

Figure 4:
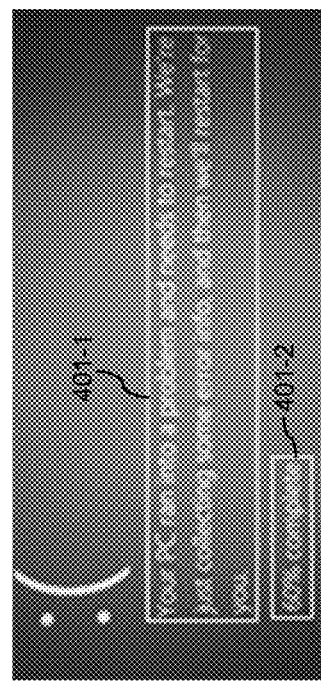
FIG. 4 depicts example regions of interest in an image according to an illustrative embodiment.

Referring to the image 400 in FIG. 4, the combined Mask-R-CNN and OCR algorithm creates boundary boxes 401-1 and 401-2 around areas in the image that include text objects. Mask-R-CNN is an object detection model used in the embodiments to provide a flexible mechanism to identify regions of interest (RoIs) in the images. In the images, the model identifies two types of objects, text objects and non-text objects. The Mask-R-CNN model is trained with OCR related data to identify RoIs in an image that are highly likely to contain text. This identification of RoIs is referred to herein as text localization. In addition to text localization, the model reads and extracts the text in a process referred to herein as text recognition.

Figure 5:
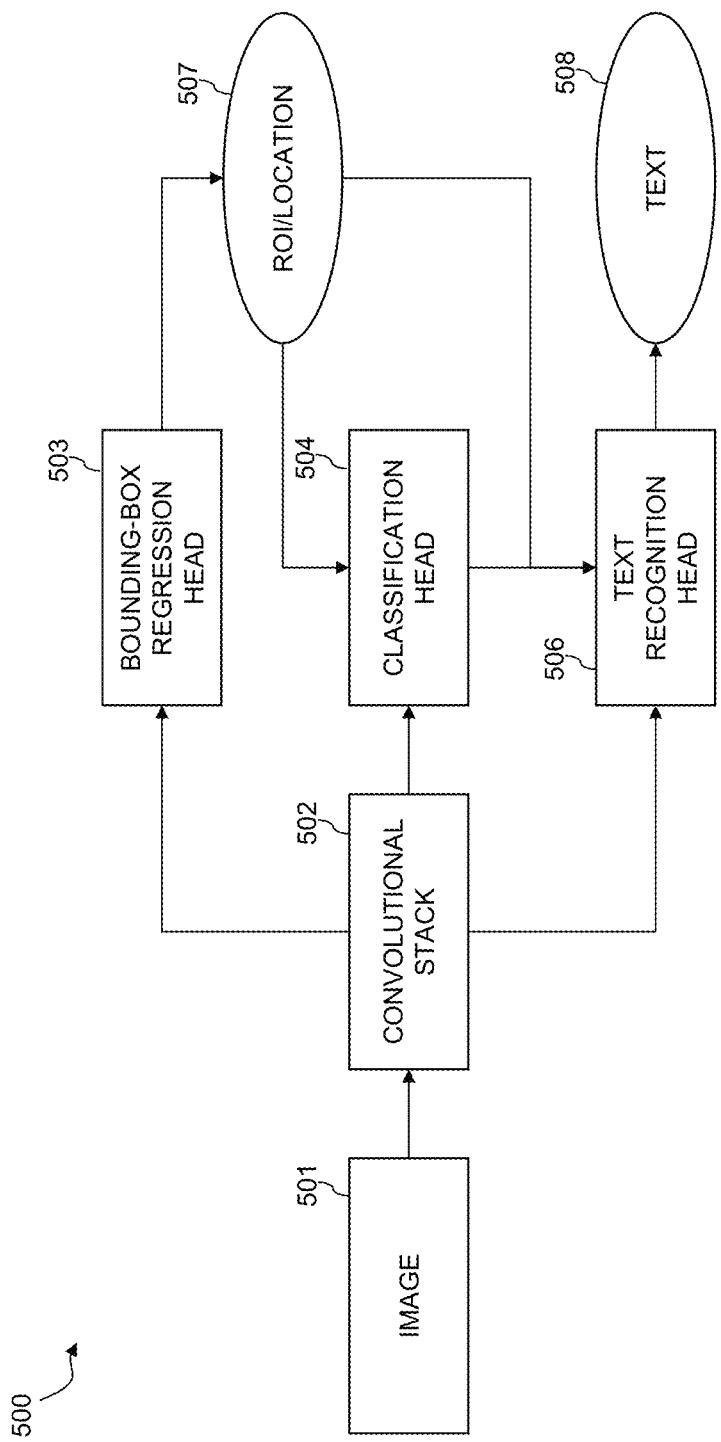
FIG. 5 depicts an architecture of a multi-task network model according to an illustrative embodiment.

Referring to FIG. 5, the Mask-R-CNN model is part of a multi-task network 500 that predicts multiple outputs from a single input image to achieve both text localization and text recognition. The model comprises three heads 503, 504 and 506, where a first head (bounding-box regression head 503) proposes boundary boxes that are likely to contain objects of interest, a second head (classification head 504) classifies which type of objects, for example, text and non-text (e.g., graphics) are contained in each box, and the third head (text recognition head 506) recognizes the text using, for example, OCR. The bounding-box regression head 503 implements a region proposal network followed by a bounding-box regression network. The output of the bounding-box regression head 503 predicts RoIs/locations 507 in the image that might contain text. The classification head 504 comprises a binary classification component that estimates a class of an object inside an RoI as text versus everything else (e.g., non-text). The text recognition head 506 receives feature maps as an input from a convolutional stack 502 and RoI coordinates generated from the bounding-box regression head 503. Convolutional neural networks (CNNs) apply a filter to an input to generate a feature map summarizing the presence of detected features in the input. The stacking of convolutional layers in the convolutional stack 502 allows for a hierarchical decomposition of the input, components of which are input to the heads 503, 504 and 506.

The multi-task network 500 uses the identified RoI/locations 507 and fetches the relevant representations for each region from the convolutional stack 502. According to an illustrative embodiment, a convolutional machine learning method with short-range kernel width is utilized. At each spatial step, the output of convolutions is used to predict an output letter and the overall sequence is collapsed through a Connectionist Temporal Classification (CTC) layer to output a final sequence for an RoI. The embodiments differ from conventional Mask-R-CNN algorithms at least by introducing text localization and recognition. Leveraging the Mask-R-CNN and OCR model and using labeled (annotated) images for training permits text extraction with higher performance and efficiency than conventional OCR based mechanisms.

Figure 6:
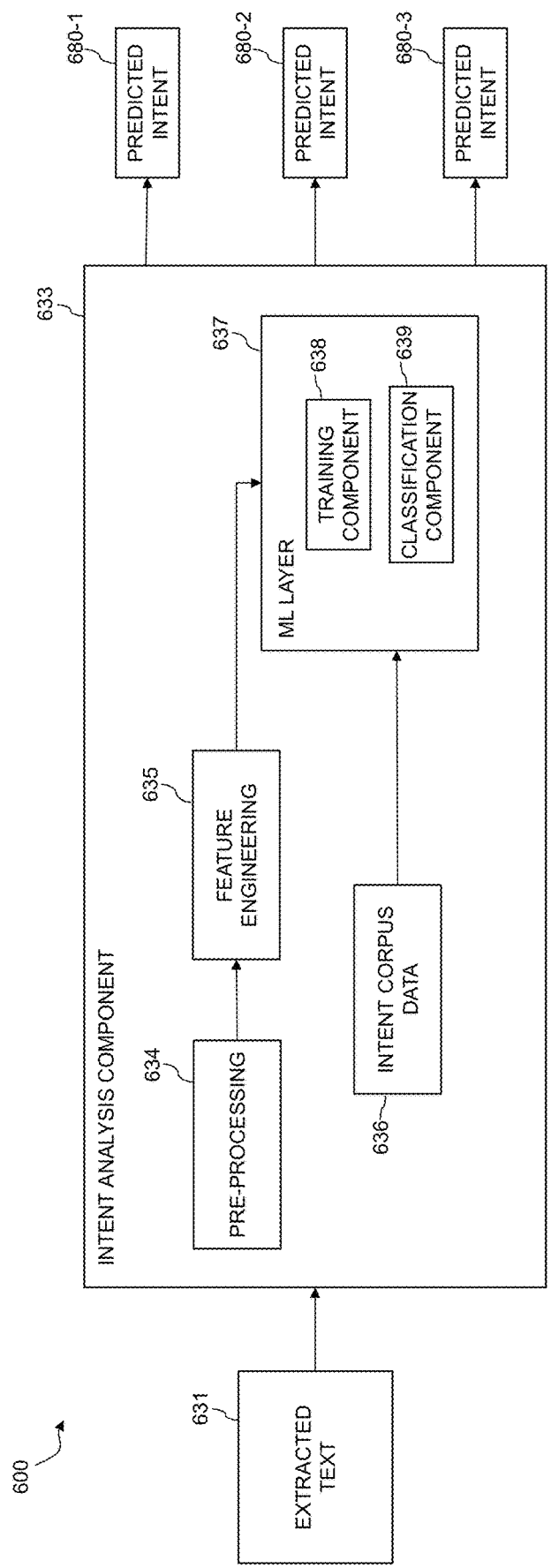
FIG. 6 depicts details of an operational flow for intent classification according to an illustrative embodiment.

Referring to FIGS. 1 and 6, the intent analysis component 133/633 uses NLU to analyze text and classify intent. The embodiments base a text message, where the words come one after another over a period of time, on a time series model, and leverage a Recurrent Neural Network (RNN). In order to efficiently analyze a message, the embodiments use a bi-directional RNN, which uses two separate processing sequences, one from left to right and another from right to left. In order to address RNNs having exploding or vanishing gradient issues for longer and complex dialogs or messages, the embodiments utilize a bi-directional RNN with long short-term memory (LSTM) for the NLU.

The machine learning model used by the ML layer 637 is a bi-directional RNN with LSTM model. Unlike a traditional neural network, where input and output are independent, in an RNN the output from a previous step feeds into the input of a current step. As a result, when performing language processing, previous words are taken into account when predicting subsequent words of a sentence. An RNN includes a hidden state which remembers one or more words in the sentence. The bi-directional RNN of the embodiments performs bi-directional processing of a sentence (from past and from future in two directions in parallel). A bi-directional RNN addresses problems where sentences are too long, and some previous words in the sentence are not available due to limited hidden states. In addition, LSTM utilized by the embodiments introduces advanced memory units and gates to an RNN to improve accuracy and performance of the machine learning model.

Referring to the operational flow 600 in FIG. 6, intent analysis by the intent classification component 633 (which is the same or similar to the intent classification component 133) uses intent corpus data 636 to train the machine learning model. This corpus data contains words and/or phrases and the corresponding intent associated with each of the words and/or phrases. A small sample of the intent corpus data used to train the machine learning model is shown in the table 700 in FIG. 7. Referring to the table 700, textual message samples are shown as corresponding to semantic intents corresponding to drivers ("System driver; Device driver installation"), blue screen of death ("B SOD") and corruption ("File corruption; Registry file corruption; Hard drive failure"). The training data is input to the training component 638 of the ML layer 637 to train the machine learning model.

Referring to FIG. 6, according to an embodiment, a pre-processing component 634 cleans any unwanted characters and stop words from the corpus data. The pre-processing further comprises stemming and lemmatization, as well as changing text to lower case, removing punctuation, and removing incorrect or unnecessary characters. Once pre-processing and data cleanup is performed, the feature engineering component 635 tokenizes the input list of words in the sentences and/or phrases. Tokenization can be performed using, for example, a Keras library or a natural language toolkit (NLTK) library. A Keras tokenizer class can be used to index the tokens. After tokenization is performed, the resulting words are padded to make the words have equal lengths so that the words can be used in the machine learning model. For output encoding, tokenization and padding are performed on the intent list in the corpus 636.

After tokenization and padding, a list of intents is indexed and fed into the machine learning model for training. The intents may be one-hot encoded before being input to the model. Some features and/or parameters used in connection with the creation of the bi-directional RNN with LSTM model include an Adam optimizer, Softmax activation function, batch size and a number of epochs. These parameters or features are tuned to get the best performance and accuracy of the model. After the model is trained with the intent corpus training data, the model is used to predict the intent for incoming dialogs and/or messages. The accuracy of the model is calculated for hyperparameter tuning.

Referring to the operational flow 600 in FIG. 6, extracted text 631 (e.g., from an uploaded image) is pre-processed and engineered by the pre-processing and feature engineering components 634 and 635, and then input to the ML layer 637 so that semantic intent can be classified (e.g., by the classification component 639) using the trained machine learning model. Predicted intents 680-1, 680-2 and 680-3 which may be outputs to the operational flow 600 include, for example, driver installation, BSOD and hard drive failure.

FIG. 8 depicts example pseudocode 800 for intent analysis and classification according to an illustrative embodiment. For the implementation of the intent analysis component 133/633, Python language and NumPy, Pandas, Keras and NLTK libraries can be used.

The semantic intent classified from the extracted text of an image is stored in the data repository 150 along with associated case resolution information for future scenarios when a customer uploads an image in connection with a request for resolution of a problem, outage or other issue. FIG. 9 depicts a table 900 including semantic intent and associated case resolution information that can be stored in the data repository 150. As shown in the table 900, semantic intent 1 ("System driver; Device driver installation") corresponds to a resolution of "Installed driver by uploading from www.company.com/drivers/system", semantic intent 2 ("BSOD") corresponds to a resolution of "Bootstrap was corrupt; system was re-imaged" and semantic intent 3 ("File corruption; Registry file corruption; Hard drive failure") corresponds to a resolution of "Dispatch for replacing hard drive at customer site".

Figure 10:
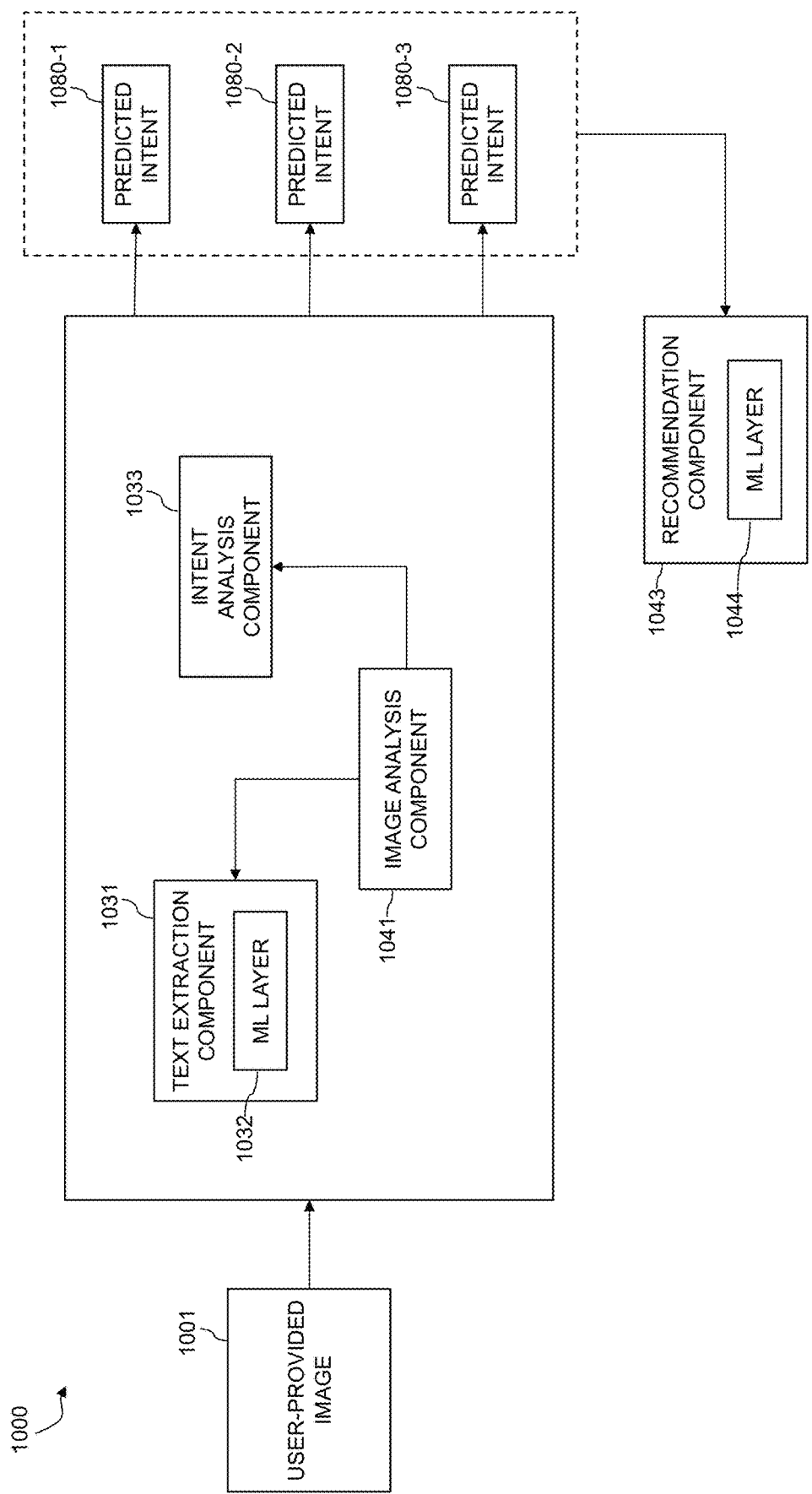
FIG. 10 depicts details of an operational flow of image analysis in connection with predicting intent and recommending resolutions according to an illustrative embodiment.

Referring to the operational flow 1000 in FIG. 10, when a user attempts to look for help and/or support via a customer support portal with an image 1001 captured by the user, the image analysis component 1041 (same or similar to the image analysis component 141 in FIG. 1) performs a reverse image search. This search is achieved by leveraging the text extraction component 1031 (same or similar to the text extraction component 131 in FIG. 1) and intent analysis component 1033 (same or similar to the intent analysis component 133 in FIG. 1 or the intent analysis component 633 in FIG. 6) to extract and analyze text from the user-provided image 1001 and determine the intent associated with the image 1001. Then, using the predicted intent, the recommendation component 1043 (same or similar to the recommendation component 143 in FIG. 1) attempts to find a match with historical image and resolution data from the platform data repository (e.g., repository 150 in FIG. 1 or 250 in FIG. 2) to recommend a resolution.

In some use cases, images comprising error messages can have very similar features, but the error messages or error codes may be different. For example, an error dialog image for a "device driver not found" message may look very similar to an error dialog image for a hard drive failure message from an image feature perspective. However, the textual messages are different, and returning case resolution information based on the images features alone may not give a user an adequate solution to the problem or issue. Accordingly, instead of matching image features, the embodiments leverage the text extraction component 1031 to extract text and/or messages from an image, and the intent analysis component 1033 to determine the intent(s) of the text and/or messages in an image. The ML layer 1032 of the text extraction component applies the combined Mask-R-CNN and OCR algorithm as described herein above to extract the text and/or messages from an image 1001.

The identified intent(s) associated with the image can then be passed to the recommendation component 1043 for recommending a resolution based on the text and/or messages in the image and not the visual image features. Advantageously, recommending a support solution based on intent, not the image itself, avoids returning irrelevant resolution information associated with similar visual images. In addition, the techniques of the embodiments are useful in situations where there are no existing historical images with which to form a match, but support tickets, case descriptions and/or notes from past resolutions are available to be compared with the determined intent to find a historical match to a current scenario. As an additional advantage, the embodiments create a foundation for potentially analyzing user textual searches and providing resolution recommendations from historical data by matching intents from the textual searches.

The recommendation component 1043 provides a support resolution recommendation based on a comparison of historical case data with a user's problem or issue derived from a conclusion about the intent of the user-provided image 1001. An ML layer 1044 of the recommendation component 1043 recommends a resolution to a given issue or problem by using NLP and distance similarity algorithms (e.g., Cosine or Euclidian) to identify similar intents from historical data in a repository (e.g., repository 150 or 250) and recommend a resolution from the historical data. The repositories 150 and 250 store historical case data and metadata with corresponding resolutions and intents as obtained from previously uploaded and/or analyzed images and/or from support case descriptions and notes. The historical data is also used to train an ML model used by the ML layer 1044 that will receive intents (e.g., predicted intents 1080-1, 1080-2 and/or 1080-3), match the received intents to similar intents in the historical case data and metadata, and recommend the most appropriate resolution based on the matching intents and their resolutions. The predicted intents 1080-1, 1080-2 and 1080-3 can be the same or similar to the predicted intents 680-1, 680-2 and 680-3 discussed in connection with FIG. 6.

According to one or more embodiments, the ML layer 1044 of the recommendation component 1043 creates a term frequency-inverse document frequency (TF-IDF) vectorizer of the semantic intents of historical training data. At least part of (or all) the intent entries in the data repository 150 or 250 may comprise the historical training data for the intent analysis component 1033 (or 633 in FIGS. 6 and 133 in FIG. 1).

TF-IDF is a numerical statistic in NLP that reflects how important a word is to a document in a collection. In general, the TF-IDF algorithm is used to weigh a keyword in any document and assign an importance to that keyword based on the number of times the keyword appears in the document. Each word or term has its respective TF and IDF score. The product of the TF and IDF scores of a term is referred to as the TF-IDF weight of that term. The higher the TF-IDF weight (also referred to herein as "TF-IDF score"), the rarer and more important the term, and vice versa. It is to be understood that the embodiments are not limited to the use of TF-IDF, and there are alternative methodologies for text vectorization.

In illustrative embodiments, the TF-IDF vectorizer is generated and used to build a TF-IDF matrix, which includes each word and its TF-IDF score for each intent entry in the historical training data (e.g., each intent entry in the data repository 150 or 250). According to an embodiment, a TfidfVectorizer function from a SciKitLearn library is used to build the vectorizer.

When a user provides an image in connection with an issue or problem (e.g., image 1001), the intent(s) determined from that image will be used to build another TF-IDF matrix based on the determined intents. The TF-IDF matrices ignore stop words. The recommendation component 1043 uses a similarity distance algorithm between the two generated TF-IDF matrices to find matching intents between the uploaded image and the historical data. The similarity functions are as follows:

tf=TfidfVectorizer(analyzer='word',ngram_range=(1,3), min_df=0,stop_words='english')
tfidf_matrix_history=tf.fit_transform(ds['intents'])

Figure 11:
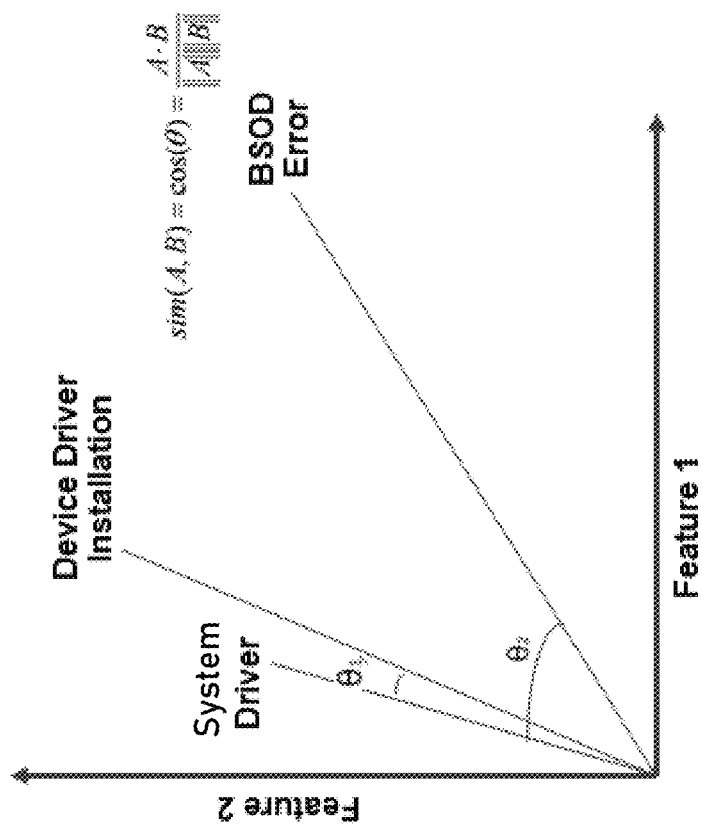
FIG. 11 depicts a graph of a cosine distance algorithm for different intents according to an illustrative embodiment.

In a similarity distance algorithm approach, using a vector space model where intents are stored as vectors of their attributes in an n-dimensional space, the angles between the vectors are calculated to determine the similarities between the vectors. The embodiments may utilize different distance algorithms such as, for example, Cosine and Euclidian distance. The application of a Cosine distance algorithm for different intents (e.g., system driver, device driver installation and BSOD error) is illustrated by the graph 1100 in FIG. 11, where angles between the vectors are represented as $\theta_1$ and $\theta_2$. According to one or more embodiments, an algorithm such as K-Nearest Neighbor (KNN) may be utilized to compute the distance similarity using Cosine distance by passing a parameter as a metric and a value as "cosine."

Figure 12:
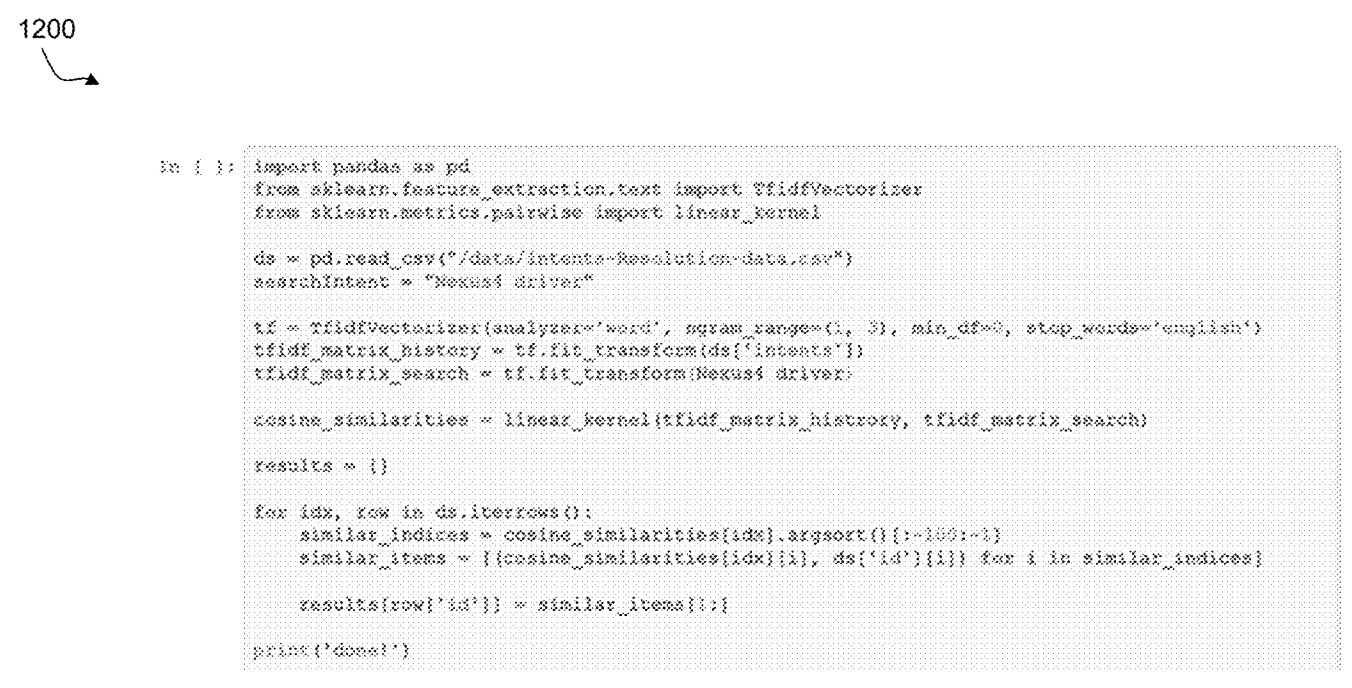

Once the intent associated with the uploaded image 1001 is matched with the intent(s) in the historical data, the recommendation component 1043 (or 143 in FIG. 1) returns the associated resolution information to the user as a recommendation. As noted above, in addition to the recommendation, the intent is also passed to a textual search engine (e.g., search engine 160) to return additional information from a knowledge base (e.g., knowledge base 161) to the user. The additional information comprises, but is not necessarily limited to, articles, manuals and guided flows. FIG. 12 depicts example pseudocode 1200 for using the similarity distance algorithm between the two generated TF-IDF matrices to find matching intents between the uploaded image and the historical data and for providing resolution information to users.

According to one or more embodiments, databases (e.g., knowledge base 161), repositories (e.g., repositories 150 and 250), stores (e.g., file stores 175 and 275) and/or corpuses (e.g., corpus 636) used by the image analysis and resolution platform 110 and/or assisted support channel 170 can be configured according to a relational database management system (RDBMS) (e.g., PostgreSQL). Databases, repositories, stores and/or corpuses in some embodiments are implemented using one or more storage systems or devices associated with the image analysis and resolution platform 110 and/or assisted support channel 170. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the image analysis and resolution platform 110, the interface layer 120, the image analysis and annotation engine 130, the image matching and recommendation engine 140, the data repository 150 and the search engine 160 in other embodiments can be implemented at least in part externally to the image analysis and resolution platform 110, for example, as stand-alone servers, sets of servers or other types of systems coupled to the network 104. For example, the interface layer 120, the image analysis and annotation engine 130, the image matching and recommendation engine 140, the data repository 150 and the search engine 160 may be provided as cloud services accessible by the image analysis and resolution platform 110.

The interface layer 120, the image analysis and annotation engine 130, the image matching and recommendation engine 140, the data repository 150 and the search engine 160 in the FIG. 1 embodiment are each assumed to be implemented using at least one processing device. Each such processing device generally comprises at least one processor and an associated memory, and implements one or more functional modules for controlling certain features of the interface layer 120, the image analysis and annotation engine 130, the image matching and recommendation engine 140, the data repository 150 and/or the search engine 160.

At least portions of the image analysis and resolution platform 110 and the components thereof may be implemented at least in part in the form of software that is stored in memory and executed by a processor. The image analysis and resolution platform 110 and the components thereof comprise further hardware and software required for running the image analysis and resolution platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the interface layer 120, the image analysis and annotation engine 130, the image matching and recommendation engine 140, the data repository 150, the search engine 160 and other components of the image analysis and resolution platform 110 in the present embodiment are shown as part of the image analysis and resolution platform 110, at least a portion of the interface layer 120, the image analysis and annotation engine 130, the image matching and recommendation engine 140, the data repository 150, the search engine 160 and other components of the image analysis and resolution platform 110 in other embodiments may be implemented on one or more other processing platforms that are accessible to the image analysis and resolution platform 110 over one or more networks. Such components can each be implemented at least in part within another system element or at least in part utilizing one or more stand-alone components coupled to the network 104.

It is assumed that the image analysis and resolution platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the interface layer 120, the image analysis and annotation engine 130, the image matching and recommendation engine 140, the data repository 150, the search engine 160 and other components of the image analysis and resolution platform 110, and the elements thereof can each be implemented in the form of one or more LXCs running on one or more VMs. Other arrangements of one or more processing devices of a processing platform can be used to implement the interface layer 120, the image analysis and annotation engine 130, the image matching and recommendation engine 140, the data repository 150 and the search engine 160, as well as other components of the image analysis and resolution platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the image analysis and resolution platform 110 to reside in different data centers. Numerous other distributed implementations of the image analysis and resolution platform 110 are possible.

Accordingly, one or each of the interface layer 120, the image analysis and annotation engine 130, the image matching and recommendation engine 140, the data repository 150, the search engine 160 and other components of the image analysis and resolution platform 110 can each be implemented in a distributed manner so as to comprise a plurality of distributed components implemented on respective ones of a plurality of compute nodes of the image analysis and resolution platform 110.

It is to be appreciated that these and other features of illustrative embodiments are presented by way of example only, and should not be construed as limiting in any way.

Accordingly, different numbers, types and arrangements of system components such as the interface layer 120, the image analysis and annotation engine 130, the image matching and recommendation engine 140, the data repository 150, the search engine 160 and other components of the image analysis and resolution platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the image analysis and resolution platform can be offered to cloud infrastructure customers or other users as part of FaaS, CaaS and/or PaaS offerings.

Figure 13:
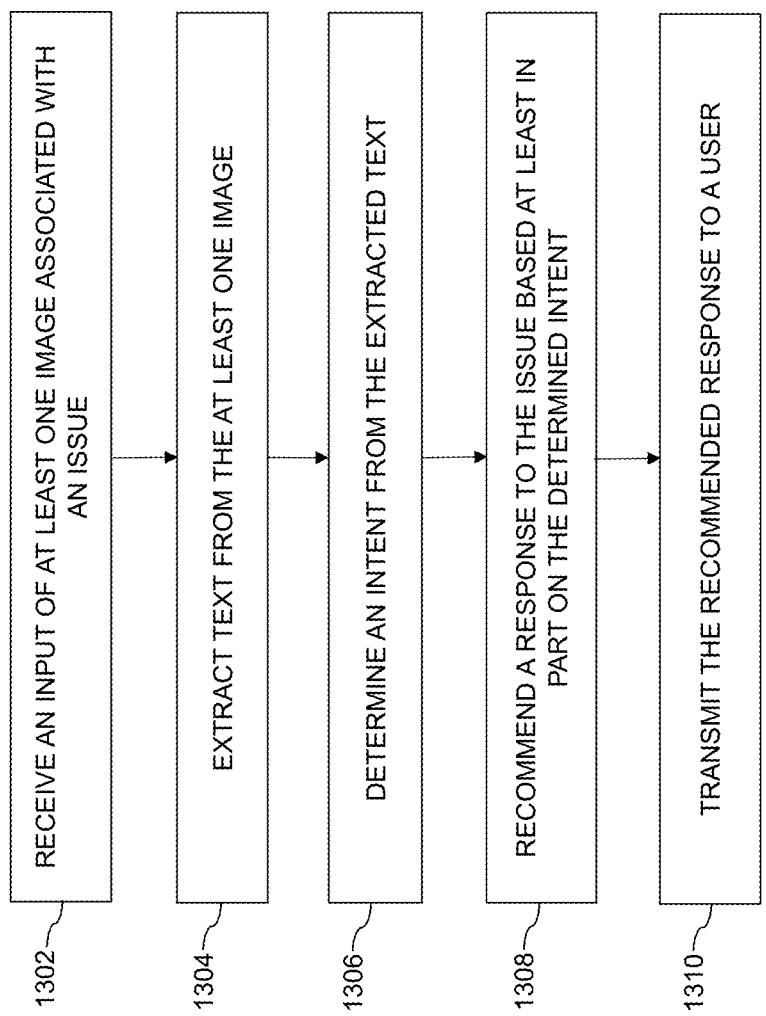
FIG. 13 depicts a process for analyzing incoming image inputs and recommending appropriate resolutions according to an illustrative embodiment.

The operation of the information processing system 100 will now be described in further detail with reference to the flow diagram of FIG. 13. With reference to FIG. 13, a process 1300 for analyzing incoming image inputs and recommending appropriate resolutions as shown includes steps 1302 through 1310, and is suitable for use in the system 100 but is more generally applicable to other types of information processing systems comprising an image analysis and resolution platform configured for analyzing incoming image inputs and recommending appropriate resolutions.

In step 1302, an input of at least one image associated with an issue is received, and in step 1304, text from the at least one image is extracted. According to one or more embodiments, the extracting comprises identifying a plurality of regions in the at least one image comprising one or more text objects, and generating respective boundaries around respective ones of the plurality of regions. The extracting may also comprise classifying objects in respective ones of the plurality of regions as one of text objects and non-text objects, and recognizing text in the one or more text objects of each of the plurality of regions.

In step 1306, an intent is determined from the extracted text, and in step 1308, a response to the issue is recommended based at least in part on the determined intent. In step 1310, the recommended response is transmitted to a user.

The extracting, determining and recommending are performed at least in part using one or more machine learning models. In accordance with an embodiment, the one or more machine learning models comprises a Mask-R-CNN and/or bi-directional RNN with LSTM for NLU.

The method may comprise training the one or more machine learning models with training data comprising a plurality of text entries and a plurality of intents corresponding to the plurality of text entries.

In an illustrative embodiment, the method comprises training the one or more machine learning models with training data comprising a plurality of intents and a plurality of issue resolutions corresponding to the plurality of intents. A TF-IDF vectorizer of the plurality of intents is created from the training data, and a TF-IDF matrix is built, the TF-IDF matrix comprising a plurality of words corresponding to the plurality of intents and a plurality of TF-IDF scores for the plurality of words.

According to an embodiment, recommending the response to the issue comprises building an additional TF-IDF matrix comprising a plurality of words corresponding to the determined intent and a plurality of TF-IDF scores for the plurality of words corresponding to the determined intent, comparing the TF-IDF matrix with the additional TF-IDF matrix to determine a matching intent from the plurality of intents to the determined intent, and recommending the issue resolution corresponding to the matching intent.

In an illustrative embodiment, a data repository is maintained, the data repository comprising respective ones of a plurality of intents associated with respective ones of a plurality of images and respective ones of a plurality of issue resolutions corresponding to the respective ones of the plurality of intents. Recommending the response to the issue comprises comparing the determined intent with the plurality of intents, identifying a matching intent of the plurality of intents to the determined intent based on the comparing, and recommending the issue resolution corresponding to the matching intent.

It is to be appreciated that the FIG. 13 process and other features and functionality described above can be adapted for use with other types of information systems configured to execute image analysis and problem resolution services in an image analysis and resolution platform or other type of platform.

The particular processing operations and other system functionality described in conjunction with the flow diagram of FIG. 13 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 13 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with an image analysis and resolution platform as disclosed herein can provide a number of significant advantages relative to conventional arrangements. For example, unlike conventional techniques, the embodiments advantageously provide techniques to perform image-based searches in a self-help portal that leverage existing support system knowledge and historical case data. The embodiments provide functionality for extracting text and/or messages from uploaded images and analyzing the extracted text to determine the intent associated with an image. Advantageously, instead of comparing visual image features to find matching images from historical data, the embodiments provide a framework to compare the determined intent with intents from images in the historical data, and to recommend corresponding resolutions associated with the matching intents to users.

Conventional approaches typically use text-based searches which are not very effective when supporting and/or troubleshooting complex problem or issues. Text-based searches also undesirably rely on the use of keywords that must be entered to understand semantics and return useful content to a user. The embodiments advantageously provide intelligent programmatic analysis of customer image data for object detection, segmentation, text detection and text extraction. The embodiments combine computer vision techniques and machine learning techniques such as, for example, OCR and neural networks to semantically analyze images associated with cases in assisted support channels and to build a repository with the images, annotations, description and case resolution metadata for addressing the issues. The data in the repository is used to train an intent classification component that utilizes deep learning to identify intents of customer provided images. The identified intents are matched with intents of corresponding images in the repository, so that a recommendation component can predict a customer issue and recommend a resolution based on historical case information.

Advantageously, the embodiments provide an optimized machine learning framework that combines select machine learning and image analysis techniques to extract the nuances of different images that may be visually similar, but convey different messages and intents. The image analysis and resolution platform performs a combination of image text extraction, intent analysis, intent comparison to historical support data and resolution recommendation to ensure that user attempts to resolve problems and/or issues are effectively and efficiently handled without need for agent intervention. The use of the text extraction, intent analysis and intent comparison techniques of the embodiments allows for the generation of accurate and useful case resolution information that is not achieved by visual image feature analysis, and is not provided by conventional text-based searches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the image analysis and resolution platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an image analysis and resolution platform in illustrative embodiments. These and other cloud-based systems in illustrative embodiments can include object stores.

Illustrative embodiments of processing platforms will now be described in greater detail with reference to FIGS. 14 and 15. Although described in the context of system 100, these platforms may also be used to implement at least portions of other information processing systems in other embodiments.

Figure 14:
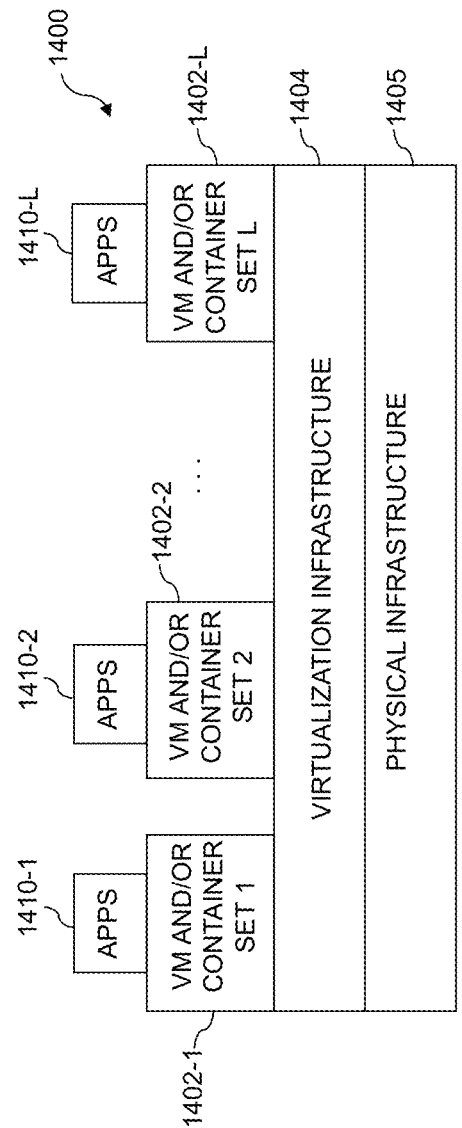
FIGS. 14 and 15 show examples of processing platforms that may be utilized to implement at least a portion of an information processing system according to illustrative embodiments.
Figure 15:
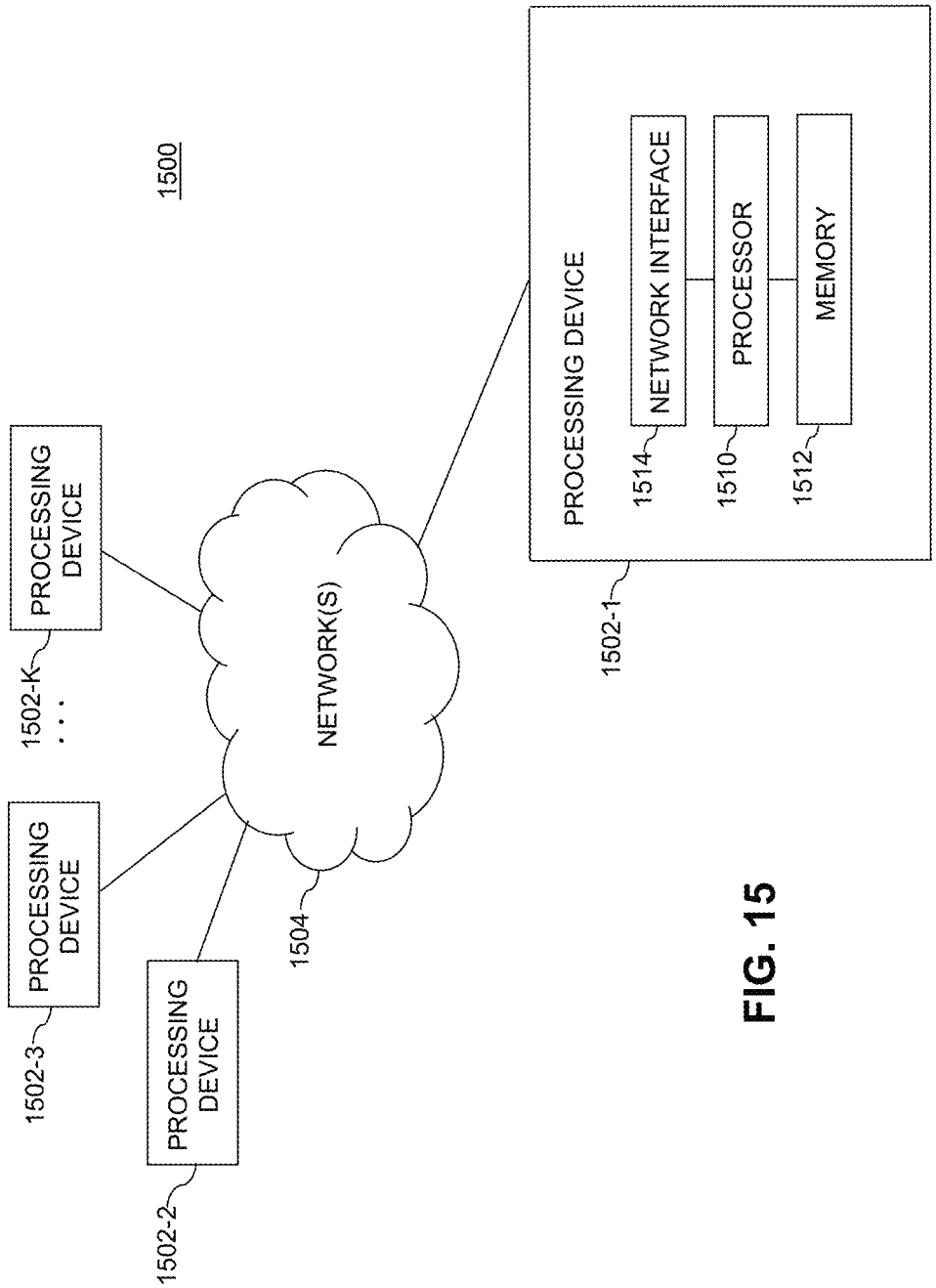

FIG. 14 shows an example processing platform comprising cloud infrastructure 1400. The cloud infrastructure 1400 comprises a combination of physical and virtual processing resources that may be utilized to implement at least a portion of the information processing system 100. The cloud infrastructure 1400 comprises multiple virtual machines (VMs) and/or container sets 1402-1, 1402-2, . . . 1402-L implemented using virtualization infrastructure 1404. The virtualization infrastructure 1404 runs on physical infrastructure 1405, and illustratively comprises one or more hypervisors and/or operating system level virtualization infrastructure. The operating system level virtualization infrastructure illustratively comprises kernel control groups of a Linux operating system or other type of operating system.

The cloud infrastructure 1400 further comprises sets of applications 1410-1, 1410-2, . . . 1410-L running on respective ones of the VMs/container sets 1402-1, 1402-2, . . . 1402-L under the control of the virtualization infrastructure 1404. The VMs/container sets 1402 may comprise respective VMs, respective sets of one or more containers, or respective sets of one or more containers running in VMs.

In some implementations of the FIG. 14 embodiment, the VMs/container sets 1402 comprise respective VMs implemented using virtualization infrastructure 1404 that comprises at least one hypervisor. A hypervisor platform may be used to implement a hypervisor within the virtualization infrastructure 1404, where the hypervisor platform has an associated virtual infrastructure management system. The underlying physical machines may comprise one or more distributed processing platforms that include one or more storage systems.

In other implementations of the FIG. 14 embodiment, the VMs/container sets 1402 comprise respective containers implemented using virtualization infrastructure 1404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1400 shown in FIG. 14 may represent at least a portion of one processing platform. Another example of such a processing platform is processing platform 1500 shown in FIG. 15.

The processing platform 1500 in this embodiment comprises a portion of system 100 and includes a plurality of processing devices, denoted 1502-1, 1502-2, 1502-3, . . . 1502-P, which communicate with one another over a network 1504.

The network 1504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1502-1 in the processing platform 1500 comprises a processor 1510 coupled to a memory 1512. The processor 1510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1512 may comprise random access memory (RAM), read-only memory (ROM), flash memory or other types of memory, in any combination. The memory 1512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the image analysis and resolution platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and image analysis and resolution platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving an input of at least one image associated with an issue;
   extracting text from the at least one image;
   determining an intent from the extracted text;
   recommending a response to the issue based at least in part on the determined intent;
   transmitting the recommended response to a user;
   wherein the extracting, determining and recommending are performed at least in part using one or more machine learning models;
   wherein the one or more machine learning models are trained with training data comprising at least a plurality of intents;
   wherein recommending the response to the issue comprises:
      building a first matrix comprising a plurality of words corresponding to the plurality of intents and a first plurality of term frequency scores for the plurality of words corresponding to the plurality of intents;
      building a second matrix comprising a plurality of words corresponding to the determined intent and a second plurality of term frequency scores for the plurality of words corresponding to the determined intent;
      comparing the first matrix with the second matrix to determine a matching intent from the plurality of intents to the determined intent; and
      recommending an issue resolution corresponding to the matching intent; and
   wherein the steps of the method are executed by at least one processing device operatively coupled to a memory.

2. The method of claim 1, wherein extracting the text from the at least one image comprises identifying a plurality of regions in the at least one image comprising one or more text objects.

3. The method claim 2, wherein extracting the text from the at least one image further comprises generating respective boundaries around respective ones of the plurality of regions.

4. The method of claim 2, wherein extracting the text from the at least one image further comprises classifying objects in respective ones of the plurality of regions as one of text objects and non-text objects.

5. The method of claim 2, wherein extracting the text from the at least one image further comprises recognizing text in the one or more text objects of each of the plurality of regions.

6. The method of claim 1, wherein the one or more machine learning models comprises a mask region-based convolutional neural network (Mask-R-CNN).

7. The method of claim 1, further comprising training the one or more machine learning models with training data comprising a plurality of text entries, wherein the plurality of intents correspond to the plurality of text entries.

8. The method of claim 1, wherein the one or more machine learning models comprises a bi-directional recurrent neural network with long short-term memory for natural language understanding.

9. The method of claim 1, further comprising training the one or more machine learning models with training data comprising a plurality of issue resolutions corresponding to the plurality of intents.

10. The method of claim 9, further comprising creating a term-frequency-inverse document frequency (TF-IDF) vectorizer of the plurality of intents from the training data.

11. The method of claim 10, wherein the first matrix comprises a TF-IDF matrix and the first plurality of term frequency scores comprises a plurality of TF-IDF scores for the plurality of words corresponding to the plurality of intents.

12. The method of claim 11, wherein the second matrix comprises an additional TF-IDF matrix and the second plurality of term frequency scores comprises a plurality of TF-IDF scores for the plurality of words corresponding to the determined intent.

13. The method of claim 1, further comprising maintaining a data repository comprising respective ones of at least some of the plurality of intents associated with respective ones of a plurality of images and respective ones of a plurality of issue resolutions corresponding to the respective ones of the at least some of the plurality of intents.

14. The method of claim 13, wherein recommending the response to the issue further comprises:
   comparing the determined intent with the at least some of the plurality of intents;
   identifying an additional matching intent of the at least some of the plurality of intents to the determined intent based on the comparing of the determined intent with the at least some of the plurality of intents; and recommending an additional issue resolution corresponding to the additional matching intent.

15. An apparatus comprising:
a processing device operatively coupled to a memory and configured to:
receive an input of at least one image associated with an issue;
extract text from the at least one image;
determine an intent from the extracted text;
recommend a response to the issue based at least in part on the determined intent;
transmit the recommended response to a user;
wherein the processing device is configured to at least in part use one or more machine learning models to perform the extracting, determining and recommending; and
wherein the one or more machine learning models are trained with training data comprising at least a plurality of intents;
wherein, in recommending the response to the issue, the processing device is configured to:
build a first matrix comprising a plurality of words corresponding to the plurality of intents and a first plurality of term frequency scores for the plurality of words corresponding to the plurality of intents;
build a second matrix comprising a plurality of words corresponding to the determined intent and a second plurality of term frequency scores for the plurality of words corresponding to the determined intent;
compare the first matrix with the second matrix to determine a matching intent from the plurality of intents to the determined intent; and
recommend an issue resolution corresponding to the matching intent.

16. The apparatus of claim 15, wherein, in extracting the text from the at least one image, the processing device is configured to identify a plurality of regions in the at least one image comprising one or more text objects.

17. The apparatus of claim 16, wherein, in extracting the text from the at least one image, the processing device is further configured to generate respective boundaries around respective ones of the plurality of regions.

18. The apparatus of claim 16, wherein, in extracting the text from the at least one image, the processing device is further configured to classify objects in respective ones of the plurality of regions as one of text objects and non-text objects.

19. An article of manufacture comprising a non-transitory processor-readable storage medium having stored therein program code of one or more software programs, wherein the program code when executed by at least one processing device causes said at least one processing device to perform the steps of:
receiving an input of at least one image associated with an issue;
extracting text from the at least one image;
determining an intent from the extracted text;
recommending a response to the issue based at least in part on the determined intent;
transmitting the recommended response to a user;
wherein the extracting, determining and recommending are performed at least in part using one or more machine learning models; and
wherein the one or more machine learning models are trained with training data comprising at least a plurality of intents;
wherein, in recommending the response to the issue, the program code causes said at least one processing device to perform the steps of:
building a first matrix comprising a plurality of words corresponding to the plurality of intents and a first plurality of term frequency scores for the plurality of words corresponding to the plurality of intents;
building a second matrix comprising a plurality of words corresponding to the determined intent and a second plurality of term frequency scores for the plurality of words corresponding to the determined intent;
comparing the first matrix with the second matrix to determine a matching intent from the plurality of intents to the determined intent; and
recommending an issue resolution corresponding to the matching intent.

20. The article of manufacture of claim 19, wherein, in extracting the text from the at least one image, the program code causes said at least one processing device to perform the step of identifying a plurality of regions in the at least one image comprising one or more text objects.

* * * * *